US010216427B2

United States Patent
Suzuki

(10) Patent No.: US 10,216,427 B2
(45) Date of Patent: Feb. 26, 2019

(54) VEHICLE DEVICE FOR EXECUTING STORED NATIVE AND EXTERNAL APPLICATIONS

(71) Applicant: DENSO CORPORATION, Kariya, Aichi-pref. (JP)

(72) Inventor: Toshifumi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 78 days.

(21) Appl. No.: 15/119,798

(22) PCT Filed: Feb. 9, 2015

(86) PCT No.: PCT/JP2015/000591
§ 371 (c)(1),
(2) Date: Aug. 18, 2016

(87) PCT Pub. No.: WO2015/133062
PCT Pub. Date: Sep. 11, 2015

(65) Prior Publication Data
US 2017/0052715 A1 Feb. 23, 2017

(30) Foreign Application Priority Data

Mar. 4, 2014 (JP) ................................. 2014-041636

(51) Int. Cl.
*G06F 12/00* (2006.01)
*G06F 3/06* (2006.01)
*G06F 12/02* (2006.01)

(52) U.S. Cl.
CPC .......... *G06F 3/0616* (2013.01); *G06F 3/0629* (2013.01); *G06F 3/0673* (2013.01); *G06F 12/0246* (2013.01); *G06F 2212/7209* (2013.01)

(58) Field of Classification Search
CPC .... G06F 3/0616; G06F 3/0629; G06F 3/0673; G06F 12/0246; G06F 2212/7209
(Continued)

(56) References Cited

U.S. PATENT DOCUMENTS 5,485,595 A * 1/1996 Assar .................... G06F 3/0601
365/185.11
2013/0159797 A1* 6/2013 Peng .................... G11C 16/349
714/718

FOREIGN PATENT DOCUMENTS

JP 2006127268 A 5/2006
JP 2008305061 A 12/2008
(Continued)

*Primary Examiner* — Hong C Kim
(74) *Attorney, Agent, or Firm* — Harness, Dickey & Pierce, P.L.C.

(57) ABSTRACT

A vehicle device includes a storage unit, a determination unit, and a regulation unit. The storage unit stores a native application execution environment and an external application execution environment, the native application execution environment includes a native application preliminarily installed in the vehicle device and a software group for executing the native application, and the external application execution environment includes an external application acquired from an external device and a software group for executing the external application. The determination unit determines a rewriting amount of the storage unit requested by the external application execution environment. The regulation unit regulates a rewriting operation of the storage unit requested by the external application execution environment based on a determination result determined by the determination unit.

7 Claims, 3 Drawing Sheets

(58) Field of Classification Search
USPC ..... 713/2, 100; 701/35, 29.1, 31.4; 717/168, 717/173; 707/813, 693; 711/103, 153, 711/154, 170
See application file for complete search history.

(56) References Cited

FOREIGN PATENT DOCUMENTS

| | | |
|---|---|---|
| JP | 2012022619 A | 2/2012 |
| JP | 2013125517 A | 6/2013 |

\* cited by examiner

VEHICLE DEVICE FOR EXECUTING STORED NATIVE AND EXTERNAL APPLICATIONS

CROSS REFERENCE TO RELATED APPLICATIONS

This application is a U.S. National Phase Application under 35 U.S.C. 371 of International Application No. PCT/JP2015/000591 filed on Feb. 9, 2015 and published in Japanese as WO 2015/133062 A1 on Sep. 11, 2015. This application is based on and claims the benefit of priority from Japanese Patent Application No. 2014-041636 filed on Mar. 4, 2014. The entire disclosures of all of the above applications are incorporated herein by reference.

TECHNICAL FIELD The present disclosure relates to a vehicle device.

BACKGROUND ART

In recent years, vehicle devices having a function of downloading data from an external server have been known. For example, Patent Literature 1 discloses the function of downloading update data for the vehicle device. The recent vehicle device can execute not only a native application preliminarily installed in the vehicle device, but also an external application downloaded from an external device such as the server. In that case, the downloaded external application and data used by the external application are written into a storage unit.

However, since the external application is downloaded by a user, it is difficult to predict application type and download size of the external application, and rewriting frequency of the storage unit by the downloaded external application. When the rewriting in the storage unit is performed beyond a durability of the storage unit, a reduction in performance of the storage unit such that failure of data storing may be occurred.

PRIOR ART LITERATURE

Patent Literature

Patent Literature 1: JP 2013-125517 A

SUMMARY OF INVENTION

In view of the foregoing difficulties, it is an object of the present disclosure to provide a vehicle device which is capable of reducing a risk of causing a performance degradation of a storage unit in an environment where an external application is executable by the vehicle device.

According to an aspect of the present disclosure, a vehicle device includes a storage unit, a determination unit, and a regulation unit. The storage unit stores a native application execution environment and an external application execution environment, the native application execution environment includes a native application preliminarily installed in the vehicle device and a software group for executing the native application, and the external application execution environment includes an external application acquired from an external device and a software group for executing the external application. The determination unit determines a rewriting amount of the storage unit requested by the external application execution environment. The regulation unit regulates a rewriting operation of the storage unit requested by the external application execution environment based on a determination result determined by the determination unit.

According to the above vehicle device, even when it is difficult to predict application type and download size of the external application to be downloaded and rewriting frequency of the storage unit by the downloaded external application, the rewriting in the storage unit can be prevented from being performed beyond a durability of the storage unit. Therefore, a risk causing the performance degradation of the storage unit can be reduced.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, an embodiment of the present disclosure will be described with reference to the drawings.

Figure 1:
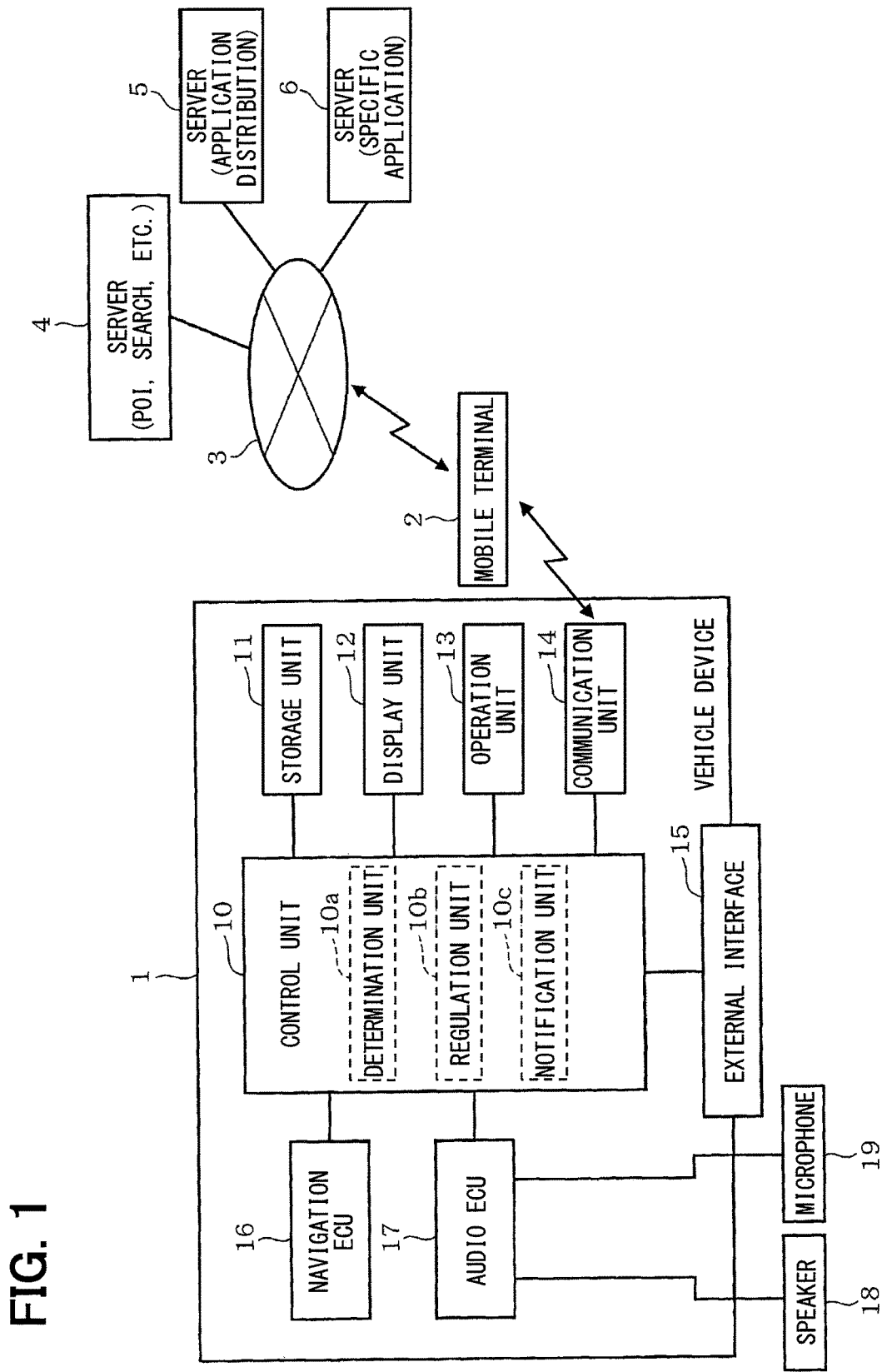
FIG. 1 is a diagram schematically illustrating an electric configuration of a vehicle device according to an embodiment of the present disclosure.

As illustrated in FIG. 1, a vehicle device 1 according to the present embodiment is configured to be communicable with a mobile terminal 2. The vehicle device 1 is configured to be communicable, via the mobile terminal 2, with external devices connected to a network 3 such as the Internet. The external devices include, for example, a server 4 that provides information related to a POI (point of interest) and a search service, a server 5 that distributes external applications, and a server 6 that provides a service corresponding to a specific application. The configuration of the servers illustrated in FIG. 1 is an example, and the number of servers and the kinds of services provided by the servers are not limited to the above configuration.

The vehicle device 1 includes a control unit 10, a storage unit 11, a display unit 12, an operation unit 13, a communication unit 14, and an external interface 15. The vehicle device 1 also includes a navigation ECU 16 (electronic control unit) for providing a navigation function and an audio ECU 17 for providing an audio function. The vehicle device 1 functions as a so-called navigation device. The vehicle device 1 may be configured to provide the navigation function and the audio function by the control unit 10, or may be configured to provide no navigation function or no audio function.

The control unit 10 in the vehicle device 1 includes a computer having a CPU, a ROM, and a RAM which are not shown. The control unit 10 includes a determination unit 10a, a regulation unit 10b, and a notification unit 10c. The determination unit 10a, the regulation unit 10b, and the notification unit 10c are provided in a software manner by a computer program to be executed by the control unit 10 in the present embodiment. Although will be described in detail later, the determination unit 10a determines a rewriting amount in the storage unit 11, and configures a determination unit. The regulation unit 10b regulates the rewriting in the storage unit 11, and configures a regulation unit. The notification unit 10c notifies a rewriting regulation of the storage unit 11, and configures a notification unit in association with the display unit 12.

The vehicle device 1 is capable of executing native applications that are preliminarily installed in the vehicle device 1. In addition to the native applications, the vehicle device 1 is also capable of executing external applications downloaded from, for example, the server 5 through the communication unit 14. For example, the vehicle device 1 can also receive a service, which is related to a downloaded specific application, from the server 6. That is, the vehicle device 1 can execute the specific application.

Figure 2:
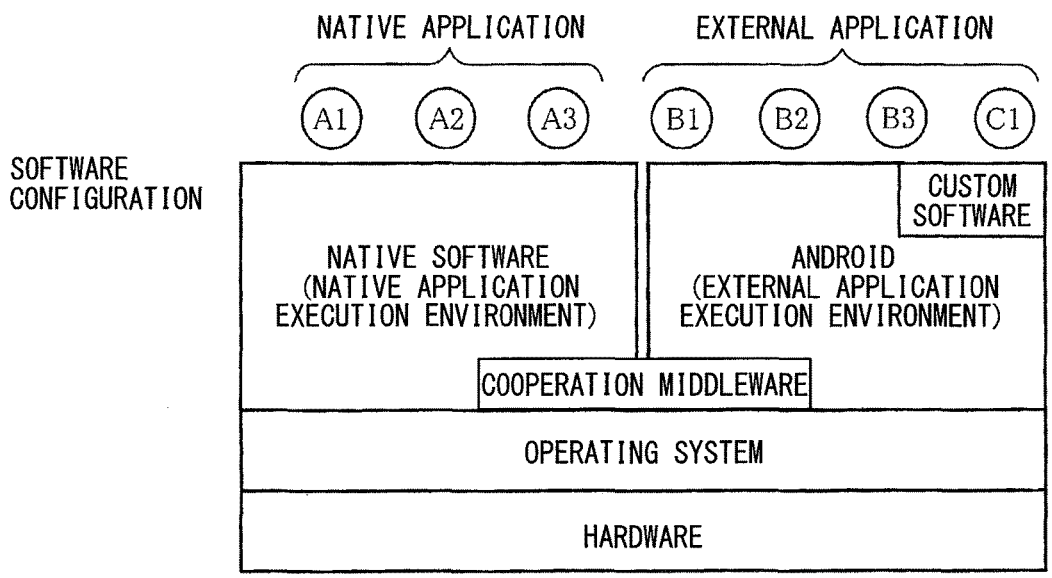
FIG. 2 is a diagram schematically illustrating a software configuration of the vehicle device.

Specifically, the vehicle device 1 is configured by software as illustrated in FIG. 2. In the software configuration, a native software is a software group for executing the native application preliminarily installed in the vehicle device 1, and configures a native application execution environment. The native applications may include an application for performing a display on the display unit 12, an application that receives operation from the operation unit 13, an application that performs a communication with the navigation ECU 16 or with the audio ECU 17, an application that outputs a sound to a speaker 18, and an application that performs a speech recognition on a sound input from a microphone 19. In FIG. 2, the native applications are denoted by A1 to A3. The number and kinds of native applications are not limited to those exemplified in FIG. 2.

Android (registered trademark) is a software group for executing the external applications downloaded from the external device such as the server 5, and configures an external application execution environment. In FIG. 2, the external applications are denoted by B1 to B3. In the present embodiment, the Android is also an execution environment of the specific application for receiving the service provided from, for example, the server 6. In FIG. 2, the specific application is denoted by C1.

The specific application is configured to receive a service having a large number of users and a service that is widely used, and can be considered substantially as one of the external applications. In the present embodiment, custom software customized for executing the specific application in a mode suitable for the vehicle device 1 is installed in a part of the Android. The number and kinds of external applications and specific applications are not limited to those exemplified in FIG. 2.

The native software and the Android are configured to be operable independently from one another. In more detail, an interference from the Android side to the native software side is restricted. For a situation in which it is necessary to take a cooperation between the native software side and the Android side, middleware is installed for providing a communication path between the native software side and the Android side.

In the present embodiment, startup of the Android is performed from the native software side. In more detail, when the user starts the Android, start operation input from the operation unit 13 by the user is received on the native software side, and a start of the Android from the native software side, that is, a start of the external application is instructed. After the Android is started, a display on the display unit 12, the reception of the operation input to the operation unit 13, input/output of a sound through the audio ECU 17, data writing in the storage unit 11, that is, rewriting in a storage area of the storage unit 11, and the like can be performed on the Android side.

The software group is stored in the storage unit 11, which is provided by an electrically rewritable semiconductor memory device such as a flash memory. In the present embodiment, an SD memory card is employed as the storage unit 11. In the present embodiment, the SD memory card is embedded in the vehicle device 1, that is, the SD memory card is non-removable from the vehicle device 1. As the storage unit 11, a mini SD card or a micro SD card having different sizes may be employed, or SHDC memory cards having different transfer speeds or maximum capacities may be employed. As the storage unit 11, a SSD (solid state disk) may be employed, or a memory card of other standards may be employed. As the storage unit 11, in addition to a memory card having a standardized configuration, a NAND flash memory may be employed by direct connection.

Figure 3:
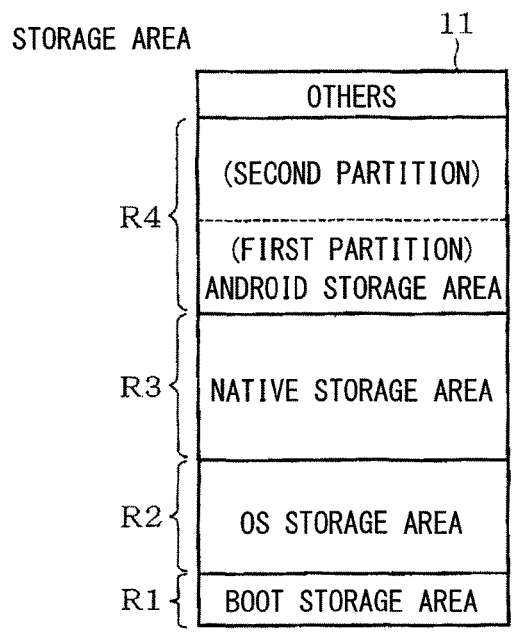
FIG. 3 is a diagram schematically illustrating an allocation mode of a storage area.

The storage unit 11 has storage areas illustrated in FIG. 3. The storage areas include a boot storage area R1 for storing a program for starting the vehicle device 1, an OS storage area R2 for storing an operating system and so on, a native storage area R3 for storing the native software, and an Android storage area R4 for storing the Android. In other words, the software group for operating the vehicle device 1 is stored in one storage unit 11 together. In the present embodiment, the Android storage area R4 is divided into multiple partitions. Among those partitions, a first partition is set to a storage area for storing the Android and the above-mentioned specific application. A second partition is set to a storage area for storing the above-mentioned external application and data used by the external application.

Meanwhile, in the semiconductor memory device employed in the SD memory card, it is general that an upper limit value is set for a rewritable number of times. For that reason, when the number of repetitive rewriting operations increases, writing failure may be occurred or data damage may be occurred to the written data. In other words, when the number of repetitive rewriting operations of data exceeds the upper limit value, a performance degradation of the storage unit 11 may be caused by the excessive repetitive rewriting operations. When the number of repetitive rewriting operations of data exceeds the upper limit value, under a configuration in which the software group for operating the vehicle device 1 is stored in the storage unit 11 together as in the present embodiment, the operation of the vehicle device 1 may be also affected by the repetitive rewriting operations executed by the excessive times. This drawback is not limited to the SD memory card employed in the present embodiment, but is similarly applied to the memory cards of other standards and the above-mentioned NAND flash memory.

Regarding the above-described circumstances, the vehicle device 1 according to the present embodiment is configured to restrict the storage performance degradation of the storage unit 11 as the following.

Figure 4:
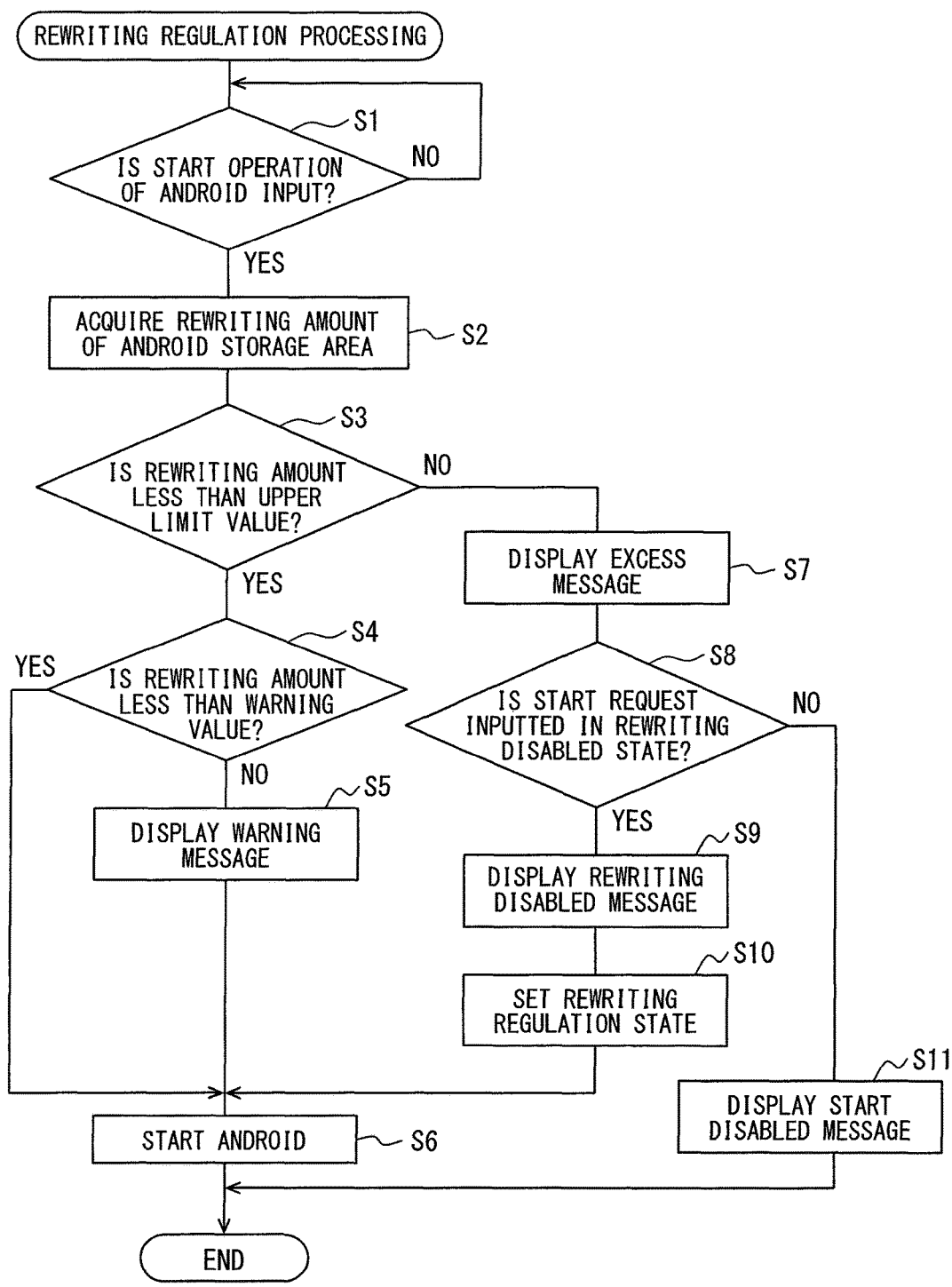
FIG. 4 is a diagram illustrating a flow of a rewriting regulation process.

The vehicle device 1 executes a rewriting regulation process illustrated in FIG. 4. As described above, because the start of the Android is performed from the native software side, the rewriting regulation process is executed on the native software side. Specifically, the following process is performed by the determination unit 10a, the regulation unit 10b, and the notification unit 10c described above. For simplifying the description, in the following description, it is described that the rewriting regulation process is executed by the vehicle device 1.

In the rewriting regulation process, the vehicle device 1 determines whether a start operation of Android is inputted to the vehicle device (S1). For example, the start operation of Android may be inputted in response to a touch operation on an icon or the like displayed on the display unit 12 by the user. When the start operation of the Android is not input (NO in S1), the vehicle device 1 waits for an input of the start operation of the Android in step S1.

When the start operation of the Android is inputted (YES in S1), the vehicle device 1 acquires a rewriting amount of the Android storage area R4 (S2). In step S2, the vehicle device 1 acquires a cumulative value of the rewriting number of times (an erasing number of times, a writing number of times) conducted to the storage unit 11 as the rewriting amount of the Android storage area R4. In the present embodiment, as the rewriting amount of the Android storage area R4, the vehicle device 1 acquires the writing amount to the overall Android storage area R4 including the first partition and the second partition. The cumulative value of the rewriting number of times is stored in the SD memory card when the general SD memory card is used as the storage unit. The cumulative value of the rewriting number of times is configured to be stored in the storage unit 11.

Subsequently, the vehicle device 1 determines whether the rewriting amount is less than the upper limit value or not (S3). In this example, the upper limit value is preliminarily determined according to the SD memory card in use. The upper limit value may be set as, for example, an upper limit value in the specification from the viewpoint of an electric characteristic of the SD memory card, or may be set as an allowable upper limit value based on a product design viewpoint of the vehicle device 1. When the rewriting amount exceeds the upper limit value, there is a possibility of causing a performance degradation of the storage unit 11. The determination in step S3 is performed by the determination unit 10a. In other words, the determination unit 10a functions as a determination unit for determining the rewriting amount of the storage unit 11 instructed by the external application execution environment side.

When the vehicle device 1 determines that the rewriting amount is less than the upper limit value (YES in S3), the vehicle device 1 then determines whether the rewriting amount is less than a warning value or not (S4). In this example, as the warning value, a value lower than the upper limit value is predetermined in advance. The warning value is a value for warning that the writing amount comes closer to the upper limit value. For example, a value of 70% of the upper limit value may be set as the warning value. When the vehicle device 1 determines that the rewriting amount is less than the warning value (YES in S4), the vehicle device 1 starts the Android operation (S6).

On the contrary, when the vehicle device 1 determines that the rewriting amount is equal to or greater than the warning value (NO in S4), the vehicle device 1 displays a warning message (S5), and thereafter starts the Android operation (S6). In other words, when the rewriting amount exceeds the warning value, the vehicle device 1 displays the warning message to inform the user that the rewriting amount comes closer to the upper limit value. In this situation, the vehicle device 1 displays the warning message such as "the rewriting number of times comes closer to the warning value" on the display unit 12.

On the other hand, when the writing amount in the Android storage area R4 is equal to or greater than the upper limit value (NO in S3), that is, when the writing amount exceeds the upper limit value, the vehicle device 1 displays an excess message (S7). For example, the vehicle device 1 displays the excess message such as "the writing amount exceeds the upper limit value" on the display unit 12. The display of the excess message, and display of a rewriting disabled message or a start disabled message which will be described later are performed by the above-mentioned notification unit 10c. In other words, the notification unit 10c functions as a notification unit for informing a fact that the rewriting of the storage unit 11 instructed by the external application execution environment side is regulated.

Meanwhile, when the writing amount exceeds the upper limit value, it is conceivable that the possibility of causing the performance degradation of the storage unit 11 is high as described above. For this reason, when the writing amount exceeds the upper limit value, the vehicle device 1 regulates the rewriting of data in the Android storage area R4. However, when the start of the Android is regulated uniformly in response to an increase of the writing amount equal to or greater than upper limit value, the execution of the external application that has already been downloaded is also regulated, and this may result in an excessive decrease in use convenience of the user.

Regarding the above-described circumstances, the vehicle device 1 displays the excess message, and also displays, for example, a confirmation message such as "Data writing in SD card is disabled. Start Android?". The vehicle device 1 determines whether a user wants to start the Android even in a rewriting disabled state. In other words, the vehicle device 1 determines whether a start request operation of the Android is inputted by the user (S8) in the rewriting disabled state of the storage unit 11.

When the start request operation of the Android is inputted by the user in the rewriting disabled state of the storage unit 11 (YES in S8), the vehicle device 1 displays the rewriting disabled message (S9). As the rewriting disabled message, such as "In a writing regulation state. The storing of data and the downloading of a new application cannot be performed." Subsequently, the vehicle device 1 sets a rewriting regulation state (S1). The rewriting regulation state is a state for regulating the rewriting in the storage unit 11 from the Android side. The rewriting regulation state is set by the regulation unit 10b. In other words, the regulation unit 10b functions as a regulation unit for regulating the rewriting in the storage unit 11 from the external application execution environment side on the basis of a determination result by the determination unit 10a.

As illustrated in FIG. 2, a rewriting command from the Android side to the storage unit 11 is transmitted to hardware (in this case, the storage unit 11) through an operating system (hereinafter referred to as "OS"). For that reason, the native software side that has received the user's operation notifies the OS of a fact that the rewriting is in the regulation state. In this configuration, when the writing command is transmitted from the Android side, the OS can regulate the writing command. The OS may be cooperated with the native software, and when the writing command is transmitted from the Android side, the transmission of the writing command from the Android side may be notified to the native software side through the OS, and the native software side that has received the notification may determine whether the rewriting is regulated, or not.

The vehicle device 1 starts the Android in the rewriting regulation state (S6). As a result, although the rewriting is restricted, the Android can be executed. In other words, the external application can be executed even though the rewriting is restricted. Meanwhile, when the Android is started in rewriting regulation state, it is preferable that the rewriting disabled message such as "writing disabled state" is always displayed on a corner of a display screen. As a result, the writing regulation, more precisely, inhibition of rewriting can be notified to the user.

It is supposed that the user may not start the Android when the download of the external application is disabled. Under this circumstance, when the start request of the Android is not inputted in the rewriting disabled state in step S8 (NO in S8), the vehicle device displays the start disabled message (S11), and completes the process. The start disabled message is, for example, a message such as "Since the rewriting amount reaches an upper limit, the Android cannot start". In this case, since the Android does not start, the rewriting is not performed in the Android storage area R4. In other words, there is no possibility of causing the performance degradation of the storage unit 11.

As described above, when the writing amount in the Android storage area R4 is less than the upper limit value, that is, when a risk of causing the performance degradation of the storage unit 11 is low, the vehicle device 1 starts the Android. On the other hand, when the writing amount in the Android storage area R4 exceeds the upper limit value, the vehicle device 1 restricts the convenience for the user from being excessively reduced while regulating the rewriting in the storage unit 11.

It is noted that a flowchart or the processing of the flowchart in the present disclosure includes sections (also referred to as steps), each of which is represented, for instance, as S1. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The vehicle device 1 according to the present embodiment described above can provide the following advantages.

The vehicle device 1 includes the storage unit 11 that stores the native application execution environment (native software) and the external application execution environment (Android). The native application execution environment includes the native application installed in advance and the software group for executing the native application. The external application execution environment (Android) includes the external application acquired from the external device and the software group for executing the external application. The determination unit 10a of the vehicle device 1 determines the rewriting amount in the storage unit 11 instructed by the external application execution environment side. The regulation unit 10b of the vehicle device 1 regulates the rewriting in the storage unit 11 instructed by the external application execution environment side based on the determination result by the determination unit 10a.

With the above configuration, even when it is difficult to predict application type and download size of external application and rewriting frequency of the storage unit 11 by the downloaded external application, the vehicle device 1 can regulate the rewriting amount in the storage unit 11. Therefore, the possibility of causing the performance degradation of the storage unit 11 such as the data storing operation failure can be reduced.

In the configuration where the native application execution environment and the external application execution environment are stored in the same storage unit 11 as in the vehicle device 1 of the present embodiment, the native application execution environment side can be prevented from being affected by unintentional rewriting instruction from the external application execution environment side.

The external application execution environment of the vehicle device 1 starts operation according to an instruction from the native application execution environment side. When it is determined that the rewriting amount in the storage unit 11 exceeds the predetermined upper limit value, the regulation unit inhibits the start of the external application execution environment in order to regulate the rewriting in the storage unit 11 by the external application execution environment side. As a result, the performance degradation of the storage unit 11 can be prevented from being caused by the rewriting instructed by the external application execution environment side.

In the above situation, when it is determined that the rewriting amount in the storage unit 11 exceeds the predetermined upper limit value, the regulation unit 10b of the vehicle device 1 starts the external application execution environment in a state where the rewriting from the external application execution environment side is inhibited. As a result, the convenience of the user can be prevented from being excessively reduced.

The determination unit 10a of the vehicle device 1 sets the cumulative value of the rewriting number of times in the storage unit 11 as the rewriting amount in the storage unit 11. Generally, a semiconductor memory device such as a flash memory has a limited rewriting number of times as described above. Thus, the determination can be performed with high precision by using the cumulative value of the rewriting number of times.

In the state where the rewriting in the storage unit 11 from the external application execution environment side is regulated, the notification unit 10c of the vehicle device 1 notifies the user of the regulation by the aid of the above rewriting disabled message or the start disabled message. As a result, the user can be notified of a reason why the Android cannot be started, and the fact that the rewriting is in the regulation state.

When it is determined that the rewriting amount in the storage area is less than the upper limit value but exceeds the predetermined warning value, the notification unit 10c displays, for example, the above-mentioned warning message to notify the user of the warning state. As a result, the user can be notified of that there are few problems with the Android use at the present time, but the rewriting amount is likely to exceed the upper limit value in the near future. Therefore, a risk that the user may encounter a trouble, such as a sudden start failure of the Android may be reduced.

According to the embodiment, the native application execution environment and the external application execution environment are configured to operate independently from one another. As a result, the native application execution environment can be prevented from being affected from the external application execution environment side.

(Other Embodiments)

The present disclosure is not limited to the exemplifications of the above respective embodiments, but can be arbitrarily modified and expanded without departing from the scope of the exemplifications.

In the foregoing embodiment, when the rewriting is forbidden in a state where the rewriting amount exceeds the upper limit value, the user is still able to start the Android. As another example, when the rewriting amount exceeds the upper limit value, the start of the Android may be inhibited together with the rewriting forbiddance.

In the foregoing embodiment, the cumulative value of the rewriting number of times is set as the rewriting amount.

Alternatively, the amount of data, that is, the use amount of the storage area may be set as the rewriting amount.

In the foregoing embodiment, the Android is described as an example of the external application execution environment, but the present disclosure is not limited to this configuration. For example, a software group that operates in another environment such as Linux (registered trademark) may be employed as the external application execution environment. In this case, it is desirable to employ software suitable for an embedded purpose. In another example, an environment which is identical to the external application execution environment may be used as the native application execution environment. For example, in an exemplary embodiment, the native application execution environment side may be also configured by the Android. In any case, when the external application execution environment operates independently of the native application execution environment, any environment may be adopted as the native and external application execution environments.

In the foregoing embodiment, the configuration in which the determination is performed on the storage area of the storage unit 11 installed in the vehicle device 1 is described as an example. Alternatively, when recording media such as an external USB memory or memory card connected through the external interface 15 are used as the storage area for the Android, the same determination of the writing amount as that in the embodiment may be performed on those external recording media.

In the embodiment, the example of determining the writing amount in the overall Android storage area R4 is illustrated. Alternatively, when the Android storage area R4 is divided into multiple partitions as in the embodiment, and a second partition is set as the storage area for the external application, it may be determined whether the writing is regulated, or not, for each partition, individually, such that the second partition is to be determined.

In the foregoing embodiment, the determination is performed on the basis of the rewriting amount in the Android storage area R4. Alternatively, the determination may be performed on the basis of the rewriting amount in the overall storage unit 11.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle device comprising:
a storage unit that stores a native application execution environment and an external application execution environment, wherein
the native application execution environment includes a native application preliminarily installed in the vehicle device and a software group for executing the native application,
the external application execution environment includes an external application acquired from an external device and a software group for executing the external application, and
the vehicle device is configured to both execute the native application, and execute the external application acquired from the external device based on the software group that is different from the software group for executing the native application;
a determination unit that determines a rewriting amount of the storage unit requested by the external application execution environment; and
a regulation unit that regulates a rewriting operation of the storage unit requested by the external application execution environment based on a determination result determined by the determination unit.

2. The vehicle device according to claim 1, wherein
the external application execution environment starts an operation according to an instruction from the native application execution environment, and
when the determination unit determines that the rewriting amount of the storage unit exceeds a predetermined upper limit value, the regulation unit regulates the rewriting operation of the storage unit requested by the external application execution environment by forbidding the external application execution environment from starting the operation.

3. The vehicle device according to claim 1, wherein
the external application execution environment starts an operation according to an instruction from the native application execution environment, and
when the determination unit determines that the rewriting amount of the storage unit exceeds a predetermined upper limit value, the regulation unit regulates the rewriting operation of the storage unit requested by the external application execution environment by allowing the external application execution environment to start the operation without performing the writing operation of the storage unit requested by the external application execution environment.

4. The vehicle device according to claim 1, wherein
the determination unit sets a cumulative value of rewriting number of times in the storage unit as the rewriting amount of the storage unit.

5. The vehicle device according to claim 1, further comprising:
a notification unit that notifies a regulation is applied to the rewriting operation of the storage unit requested by the external application execution environment.

6. The vehicle device according to claim 5, wherein
the notification unit notifies a user of a warning when the determination unit determines that the rewriting amount of the storage unit is less than the upper limit value and greater than a predetermined warning value.

7. The vehicle device according to claim 1, wherein
the software group for executing the external application and the software group for executing the native application are configured to operable independently from each other.

* * * * *